US011010730B2

(12) United States Patent
Knox et al.

(10) Patent No.: US 11,010,730 B2
(45) Date of Patent: May 18, 2021

(54) SCOPE-DELIMITED SHARING OF ENCODED SENSITIVE DATA

(71) Applicant: PAYPAL, INC., San Jose, CA (US)

(72) Inventors: Joshua Knox, San Jose, CA (US);
Benjamin Mills, San Jose, CA (US);
Rohit Turumella, San Jose, CA (US);
Chris Sanger, San Jose, CA (US);
Michael Nussbaum, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 183 days.

(21) Appl. No.: 15/705,879

(22) Filed: Sep. 15, 2017

(65) Prior Publication Data

US 2018/0075418 A1 Mar. 15, 2018

Related U.S. Application Data

(60) Provisional application No. 62/395,094, filed on Sep. 15, 2016.

(51) Int. Cl.
*H04L 29/06* (2006.01)
*G06Q 20/08* (2012.01)
(Continued)

(52) U.S. Cl.
CPC ..... *G06Q 20/0855* (2013.01); *G06F 21/6245* (2013.01); *G06Q 20/12* (2013.01);
(Continued)

(58) Field of Classification Search
CPC .. G06Q 20/0855; G06F 21/6245; H04L 67/02
(Continued)

(56) References Cited

U.S. PATENT DOCUMENTS 8,689,354 B2 * 4/2014 Grube ................ G06F 11/1076
726/29
9,177,174 B1 * 11/2015 Shoemaker ............. H04L 63/08
(Continued)

OTHER PUBLICATIONS

Oat, "Integrating payment solutions to online marketplaces", May 30, 2016, Aalto University, pp. 1-67 (Year: 2016).*

*Primary Examiner* — Taghi T Arani
*Assistant Examiner* — Gregory A Lane
(74) *Attorney, Agent, or Firm* — Haynes and Boone, LLP (57) ABSTRACT

Techniques for providing access to scope-delimited sensitive data are disclosed. A user provides sensitive data to a first party associated with a payment service provider. The first party stores the sensitive data with the payment service provider, and the payment service provider provides the first party merchant with an encoding of the payment data. The first party provides a purchasing opportunity to the user for goods offered by a third party also associated with the payment service provider. The first party transmits a sensitive data grant request to the payment service provider. In response, the payment service provides a scope-delimited encoding of the sensitive data. The first party provides the scope-delimited encoding of the payment data to the third party. The third party merchant creates a transaction using the scope-delimited encoding of the sensitive data. At some time later, access to the scope-delimited encoding of the sensitive data is revoked.

20 Claims, 5 Drawing Sheets (51) Int. Cl.
*H04L 29/08* (2006.01)
*G06F 21/62* (2013.01)
*G06Q 20/12* (2012.01)
*G06Q 20/38* (2012.01)

(52) U.S. Cl.
CPC ....... *G06Q 20/385* (2013.01); *G06Q 20/3821* (2013.01); *H04L 67/02* (2013.01)

(58) Field of Classification Search
USPC .................................................... 726/29, 30
See application file for complete search history.

(56) References Cited

U.S. PATENT DOCUMENTS

| | | | |
|---|---|---|---|
| 2004/0002878 A1* | 1/2004 | Maria Hinton .... | G06Q 20/3821 705/76 |
| 2004/0128546 A1* | 7/2004 | Blakley, III ........ | G06F 21/6245 726/8 |
| 2012/0173881 A1* | 7/2012 | Trotter .................. | H04L 9/0825 713/189 |
| 2013/0198080 A1* | 8/2013 | Anderson .............. | G06Q 20/26 705/44 |
| 2015/0295916 A1* | 10/2015 | Sanso ................. | H04L 63/0807 726/9 |
| 2016/0301683 A1* | 10/2016 | Laxminarayanan ......................... | H04L 63/0807 |

* cited by examiner

SCOPE-DELIMITED SHARING OF ENCODED SENSITIVE DATA

CROSS REFERENCE TO RELATED APPLICATIONS

The present application claims priority to and incorporates by reference U.S. Provisional Patent Application Ser. No. 62/395,094, filed on Sep. 15, 2016.

BACKGROUND

Field

The present disclosure generally relates to systems and methods for securely providing revocable access to sensitive data to a third party.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider. Such payment service providers can make transactions easier and safer for the parties involved. Purchasing with the assistance of a payment service provider from the convenience of virtually anywhere using a mobile device is one main reason why on-line and mobile purchases are growing very quickly. One challenging aspect to facilitating purchasing and commerce between businesses is securely sharing and transmitting a consumer's payment information or other sensitive data from one business, such as a first party merchant, to a third party, such as a third party merchant.

Thus, there is a need for a system and method for providing access to sensitive data.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing, by a first party to a third party, access to encoded, scope-delimited sensitive data, such as payment data and identity data. In one embodiment, a consumer may provide sensitive data (such as payment data) to a first party merchant having a relationship with a payment service provider. The first party merchant may securely store the payment data with the payment service provider, and the payment service provider may provide the first party merchant with an encoding of the payment data, such as a payment method token. The first party merchant may store the encoding of the payment data. The first party merchant may provide a purchasing opportunity to the user to purchase goods or services offered by a third party merchant which also has a relationship with the payment service provider. In response to a user indication that the user would like to purchase the goods or services offered by the third party merchant, the first party merchant transmits a sensitive data grant request (e.g., a payment method grant request) to the payment service provider. In response, the payment service provider may provide, to the first party merchant, a scope-delimited encoding of the sensitive or payment data (e.g., a scoped shareable payment method token). The first party merchant may then provide the scope-delimited encoding of the payment data to the third party merchant, along with other pertinent information for the transaction if necessary. The third party merchant may create a transaction using the scope-delimited encoding of the payment data, and may provide a response to creation of the transaction to the first party merchant, which in turn may transmit the response to the user. At some time later, the user, or the first party merchant, may choose to revoke access to the scope-delimited encoding of the payment data. The payment service provider or third party merchant may destroy the scope-delimited encoding of the payment data, and may transmit a response to the first party merchant.

As described above, one challenging aspect to facilitating purchasing and commerce between businesses is securely sharing and transmitting a consumer's payment information or other sensitive data from a first party, such as a business, to a third party. For example, a user may discover products and services using an application provided by a first party merchant, which may include a social networking platform, referral platform, discount or coupon website, or any other provider of applications and websites tailored to consumer discovery of products and services. As one example, a social networking platform may tailor advertisements to users for products offered by various advertisers operating advertising campaigns targeting users of the social networking platform. Similarly, an entity may offer a virtual clipboard or idea board service to users that facilitates users' discovery, saving, and sharing of products and services of interest to its users.

In some instances, a first party merchant may wish to allow its users to purchase products or services offered by the first party merchant (e.g., virtual goods, additional features, premium access, etc.). In turn, the first party merchant may establish a relationship with a payment service provider, such as BRAINTREE®, a division of PAYPAL® of San Jose, Calif. Some payment service providers may offer a vaulting service in which the user's sensitive data, that is, payment details (e.g., credit card number, bank account number, etc.) are securely transmitted to the payment service provider and stored by the payment service provider. The payment service provider, in turn, provides an encoding of the sensitive data in the form of a payment method token to the first party merchant, which the first party merchant stores on its own systems. An advantage of the vaulting service is that the first party merchant does not have to store the user's payment details on its own systems, which would entail necessary compliance with PCI DSS or other security standards. Using the vaulting service, the payment service provider maintains compliance with security standards, and provides, to the first party merchant, a token that can only be interpreted by the payment service provider. When the user wishes to purchase a product or service from the first party merchant, the first party merchant transmits the payment method token to the payment service provider, which may charge the associated funding source using the stored payment details.

As discussed above, the first party merchant's platform (e.g., application or website) may also facilitate discovery of other products or services offered by third party merchants that may be of interest to users. In turn, the users may wish to purchase those products or services from the third party merchants. Typically, to do so, the user clicks on a link associated with the product or service, and is redirected to the website of the third party merchant. To purchase the product or service, the user may have to again enter his or her payment details on the third party merchant's website, which are then transmitted to a payment service provider or to a payment processor.

The process of again entering the user's payment details may result in an undesirable user experience. Each additional step in the purchasing flow increases the chance that the user will abandon the purchase. Further, the first party merchant, in most cases, already has a payment method token for the user's payment information.

Providing a method for the first party merchant to share the payment method token with other merchants allows the first party merchant to serve as a purchasing platform for a potentially unlimited number of third party merchants. In some instances, the first party merchant may receive a portion of purchases made at third party merchants, thereby increasing the first party merchant's revenue. Further, in some instances, the purchase of the third party merchant's product or service can occur within the first party merchant's application or website, providing a seamless experience to the user, and maintaining the first party merchant's branding and look and feel.

In accordance with one embodiment, if the third party merchant has a relationship with the same payment service provider as the first party merchant, the first party merchant may grant access to the user's payment information by requesting a payment method grant for the third party merchant. The payment method grant may provide the third party merchant with a shareable token that can be used for purchasing goods and services. In one embodiment, the payment method grant occurs when the user wishes to purchase a product or service from the third party merchant through the first party merchant's platform. In one embodiment, the payment method grant and scoped shareable token is only for the one transaction with the third party merchant. In one embodiment, the payment method grant and scoped shareable token may have an associated scope defined by time, amount, merchant, or other criteria. For example, the scoped shareable token may be valid for one week, or may be valid for a maximum of $50. In one embodiment, the payment method grant and the scoped shareable token have an unlimited scope.

Figure 1:
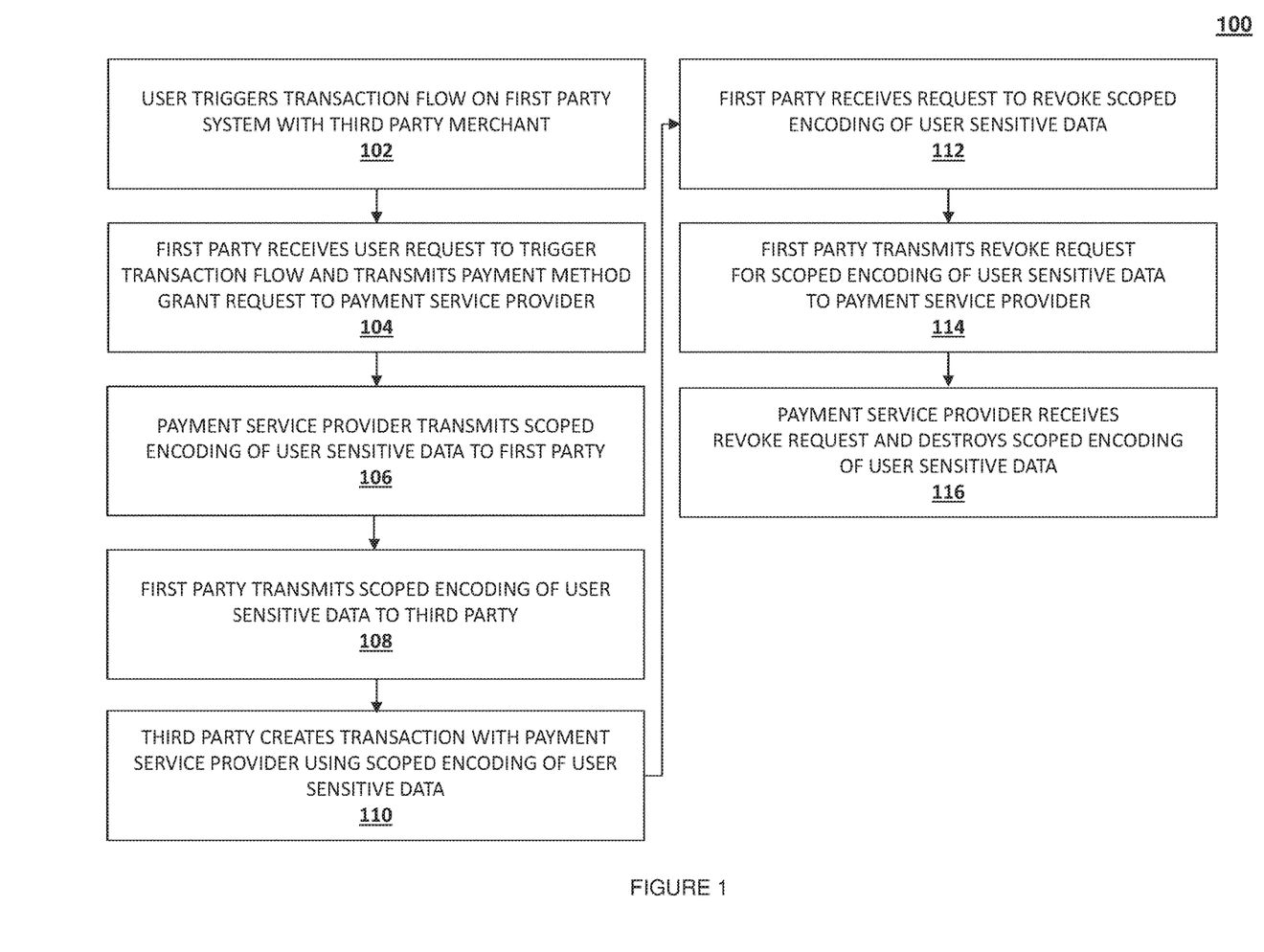
FIG. 1 is a flow chart illustrating an embodiment of a method for providing, by a first party to a third party, encoded, scope-delimited sensitive data.

Referring now to FIG. 1, a method 100 of providing, by a first party to a third party, encoded, scope-delimited sensitive data for a user is described. The first party and third party may be a first party merchant and third party merchant, respectively, and the encoded, scope-delimited sensitive data may be a scoped shareable token, which itself is an encoding of payment method information. In the method 100 described below, a first party and third party have established a relationship with a payment service provider. Further, in the method 100 described below, the user may have previously provided sensitive data, such as payment data, to the first party, which has then in turn transmitted the sensitive data to the payment service provider. The payment service provider may have provided a encoding of the payment data to the first party, such as a payment method token, which the first party may have then saved on its systems.

Method 100 will be further described herein with reference to a real-world example in which a first party provider of a messaging application wishes to allow its users to book rides with a third party provider of a taxi application. To do so, the taxi application requires a secure way of accessing the messaging application's user payment methods. In this example, both the messaging application and the taxi application have a relationship with the same payment service provider. The payment service provider has already provided, to the messaging application, a payment method token for a user's payment method.

The method 100 begins at block 102, where the user triggers a transaction flow on the first party's systems. At block 102, the user's request to trigger the transaction flow is received by the first party's systems. For example, the user may trigger a purchase request for a product or service within an application or website provided by the first party. In one example, the user may wish to purchase a product from a third party merchant discovered within the first party's application. Thus, in the example above, a user of the messaging application may request a ride with the taxi application.

Once the first party has received the user's request to trigger the transaction flow, method 100 proceeds to block 104, where the first party transmits a payment method grant request (i.e., a request to provide a scoped encoding of sensitive data) to the payment service provider. In one embodiment, the transmission of the payment method grant request includes transmission of an access token. The access token, in one embodiment, provides the first party with the right to grant a payment method, or provide a scoped encoding of sensitive data, to a third party. In one embodiment, each access token has encoded information about the third party that the access token is for. For example, the access token may include an identifier for the third party with the payment service provider and an environment variable. In one embodiment, the access token, and the payment method grant request process, uses OAuth or another standard for authorization. In one embodiment, the payment method grant request also includes the previously-established first party's stored encoding of the user's payment data, i.e., the first party's payment method token. Thus, in the example above, the messaging application may request a payment method grant for the taxi application.

As described above, the payment method grant request may include a merchant identifier for the third party, an access token, and the first party's payment method token for the user's payment information. The payment method grant request may also specify, in a variable, whether the third party can vault, or store, the result of the request, which is a scoped shareable payment method token. In one embodiment, the payment method grant request is an HTTP POST request to an application programming interface (API) provided by the payment service provider.

Method 100 then proceeds to block 106, where the payment service provider transmits, to the first party, the scoped encoding of the user's sensitive data, which also may be referred to as a scoped shareable payment method token, granted payment method, payment method grant, or payment method nonce. In one embodiment, the response from the payment service provider is an HTTP response formatted in extensible markup language (XML). In one embodiment, if the payment method cannot be granted to a third party, an HTTP error code 422 may be returned. In one embodiment, if a non-existent payment method token is specified in the grant request at block 104, an HTTP error code 404 may be returned. Thus, in the example given above, the payment service provider may transmit the payment method grant for the taxi application to the messaging application.

In one embodiment, the scoped shareable payment method token can be used by the third party as many times as the third party wishes. Further, the third party's scoped shareable payment method token can be used in the same way as the first party's payment method token. In one embodiment, the third party's scoped shareable payment method token cannot be used to grant, to another third party, a subsequent payment method grant. Additionally, in one embodiment, the third party's scoped shareable payment method token is not included in an export of the third party's payment methods if the third party chooses to leave the payment service provider in the future.

In one embodiment, the first party may impose a scope on the payment method grant. For example, the first party can, in the payment method grant request, specify that the payment method grant expires after a set amount of time (e.g., 24 hours, 7 days, etc.). Additionally, the first party can specify that the payment method grant is only authorized for a specific amount of funds (e.g., $25, $100, etc.). Other limitations on scope are also contemplated and possible for the payment method grant. In one embodiment, the user may specify the scope of the payment method grant in its interactions with the first party's website or application. For example, the first party's website or application provide a user interface to ask the user if the user authorizes sharing of payment data, and within the user interface, allow the user to specify a scope on authorized sharing of the user's payment data.

Method 100 then proceeds to block 108, where the first party transmits, to the third party, the scoped shareable payment method token (i.e., the scoped encoding of the user's sensitive data). In one embodiment, the transmission at block 108 also includes additional information required for the transaction, such as the user's shipping address, or other information required by the third party merchant's systems. Thus, the messaging application may transmit, to the taxi application, the payment method grant, and other information, like the user's name and destination. In one embodiment, the scoped shareable payment method token is transmitted directly to the third party.

Method 100 then proceeds to block 110, where the third party creates a transaction with the payment service provider. The request to create a transaction may include the scoped shareable payment method token. The payment service provider may then transmit, to the third party, the status of the transaction. The third party may perform additional business logic as needed for the transaction (e.g., prepare products for shipment, transmit order updates to the user, etc.). Additionally, the third party may transmit a response to the first party to inform the first party of the status of the transaction. In turn, the first party may transmit to its user the status of the transaction. Here, in the example above, the taxi application may transmit, to the messaging application, the location of the taxi driver.

At a later time, method 100 then proceeds to block 112, where the user requests that the first party revoke the third party's access to the user's payment data (i.e., the user requests that the payment method grant be destroyed, such that the third party no longer has the scoped shareable payment method token or scoped encoding of the user's sensitive data). In one embodiment, the user may request that the first party revoke the third party's access to the user's payment data within an application or website provided by the first party. In one embodiment, the first party may transmit its own request to revoke the third party's access to its users' payment data.

Accordingly, method 100 then proceeds to block 114, where the first party transmits, to the payment service provider, a revoke request for the payment method grant. In one embodiment, the revoke request for the payment method grant is an HTTP POST request to an application programming interface (API) provided by the payment service provider. The revoke request may include, in one embodiment, the merchant identifier for the third party, an access token, and the first party's payment method token for the user's payment information.

Method 100 then proceeds to block 116, where the payment service provider receives the revoke request and destroys the payment method grant. The information in the revoke request may be used to search and identify the third party's version of the payment method. The payment method grant is deleted from the third party's vault. As a result of a revoke request, the third party cannot create future transactions using the payment method grant. The payment service provider then transmits, to the first party, an indication that the destruction was successful. In one embodiment, the revoke request may be automatically generated if, for example, the specific amount time specified in the grant request has elapsed.

In one embodiment, if the third party attempts to use a revoked payment method grant, the third party may receive an error with an HTTP status code of 422. In one embodiment, revoking a payment method grant only deletes the specific payment method grant from the third party's vault; other payment methods may remain active until separately revoked.

In one embodiment, transactions made with payment method grants may trigger notifications to the first party with details of the transaction. In one embodiment, the notifications may be webhook notifications that are configurable with the payment service provider. The webhook notifications can be integrated with an API and with any endpoints the first party wishes to use.

In one embodiment, once a third party has vaulted a payment method using its payment method grant, there may be two versions of the payment method with the payment service provider. First, the first party may have a version of the payment method in its own vault. Second, the third party may have a version of the payment method from the payment method grant, i.e., the scoped shareable payment method token, in its own vault. To ensure payment method grants operate like normal payment methods, the third party may have the ability to update a scoped shareable payment method token. The first party may also update its own payment method.

Thus, in one embodiment, when a payment method (in the first party vault) or a scoped shareable payment method token (in the third party vault) is updated, associated parties are also updated using a webhook notification. Such a webhook notification may give the party with the outdated information the ability to update any details that might affect the payment method's chances of being declined. Thus, only updates to particular fields for a payment method may trigger a webhook. For example, for credit cards, only changes to an expiration month, expiration year, card number, and billing address zip code may trigger a webhook notification. In one embodiment, the webhook notification includes a payment method token, identifiers for the parties associated with the payment method token, a list of updated fields, and a new payment method nonce. The nonce may be used as an input to a payment method update process, which may refresh the vaulted version of the listed fields with the new values from the update that triggered the webhook. In one embodiment, the webhook includes an XML payload.

In one embodiment, webhooks may be used for other purposes as well. For example, in some circumstances, a user may initiate a credit card dispute (e.g., a chargeback) based on a transaction with a third party which used a scoped sharable payment method token associated with a first party. In one embodiment, a webhook notification may notify the first party that the chargeback was initiated. Such notifications may assist the first party in gaining insight as to fraudulent or unauthorized uses of its payment method tokens, and may lead to other action taken by the first party (e.g., revocation of the scoped shareable payment method token).

Figure 2:
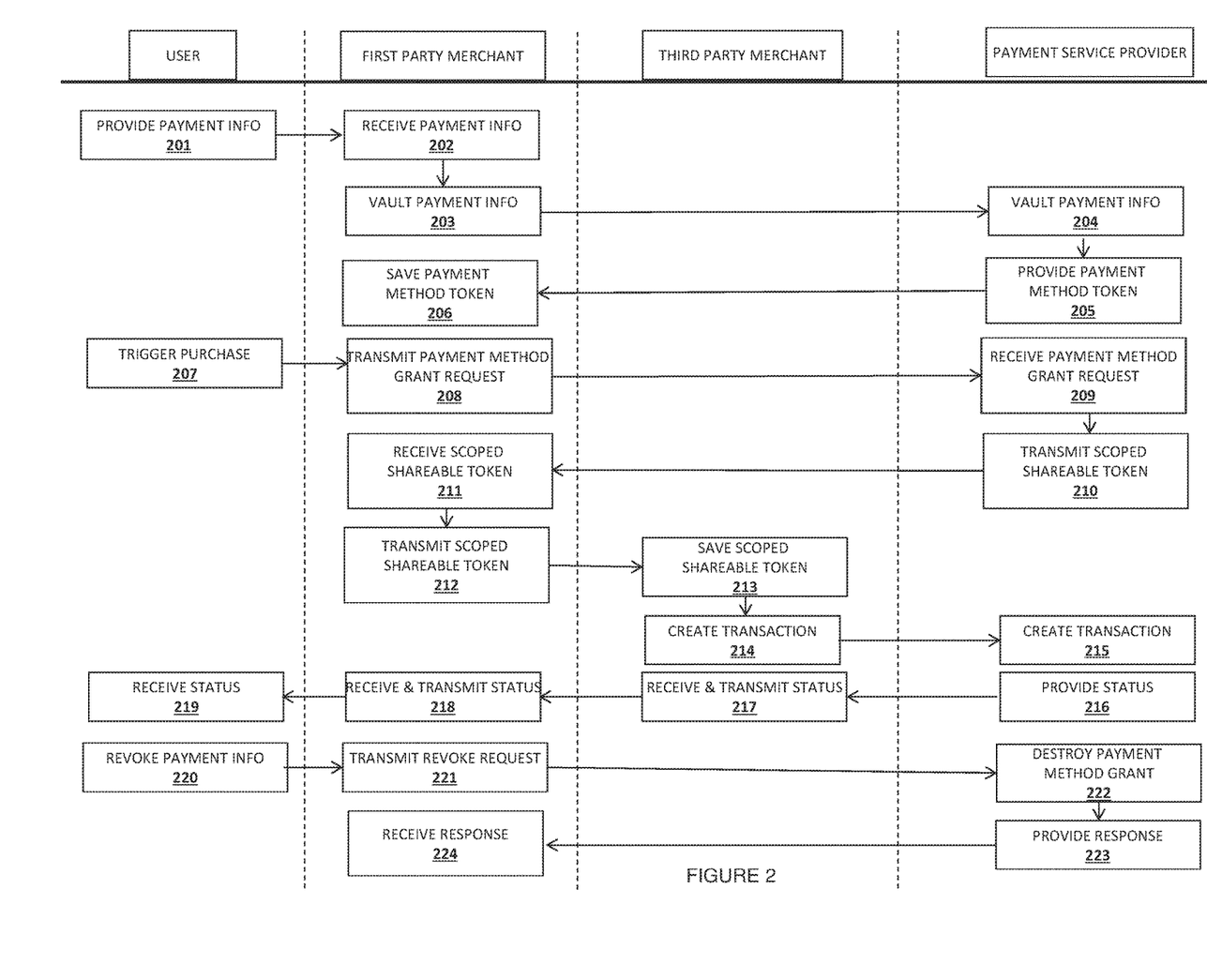
FIG. 2 is a swim lane diagram illustrating interactions between a user, a first party, a third party, and a payment service provider, in accordance with one embodiment.

Referring now to FIG. 2, a swim lane diagram 200 depicts the events that may occur and the steps of the method 100 performed by the user, first party merchant, third party merchant, and payment service provider. At step 201, a user provides payment information (e.g., credit card information) to the first party merchant, which receives the information at step 202. At step 203, the first party merchant transmits a request to vault the payment information to the payment service provider, which vaults the information at step 204, and generates and provides a payment method token at step 205, which is saved by the first party merchant at step 206.

At step 207, the user triggers a purchase from the third party merchant, and in response, at step 208, the first party merchant transmits a payment method grant request to the payment service provider, which is received at step 209. At step 210, the payment service provider transmits a scoped shareable token to the first party merchant, which is received at step 211. At step 212, the first party merchant transmits the scoped shareable token to the third party merchant, which saves the scoped shareable token at step 213. Subsequently, the third party merchant may create a transaction at step 214 using the scoped shareable token and the information contained therein, which results in a transaction being created at the payment service provider at step 215. At step 216, the payment service provider may provide the status of the transaction to the third party merchant, which is received and transmitted in turn to the first party merchant at step 217, which itself is received and transmitted to the user at step 218, who receives the status at step 219.

As described above, at a later date, the user may wish to revoke the scoped shareable token with the payment method information, and may transmit a request at step 220, which is received by the first party merchant and transmitted at step 221 to the payment service provider. At step 222, the payment service provider destroys the scoped shareable token and payment method grant, and provides a response at step 223, which is received by the first party merchant at step 224.

Figure 3:
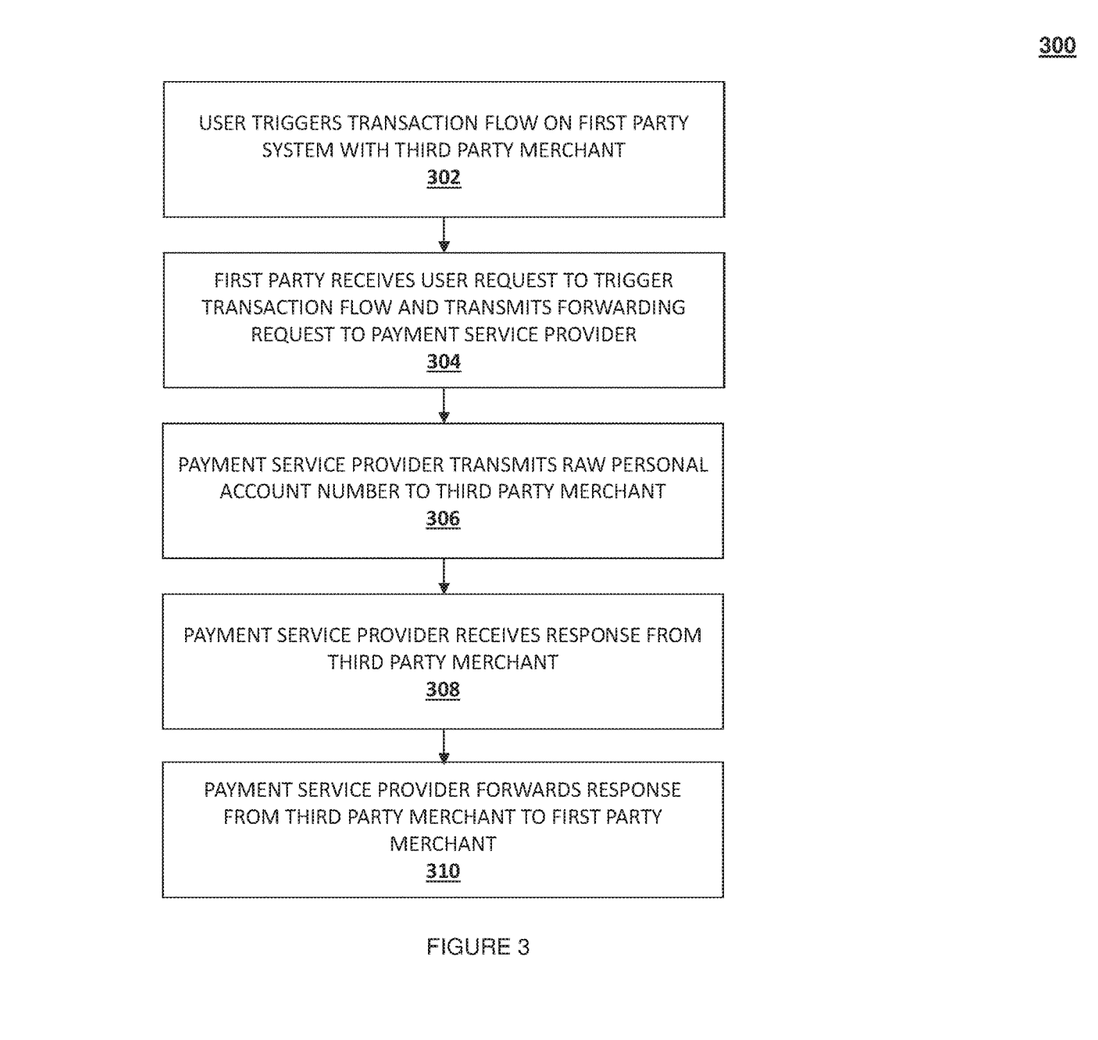
FIG. 3 is a flow chart illustrating an embodiment of a method for providing, by a first party to a third party, payment method data.

Referring now to FIG. 3, a method 300 of providing, by a first party to a third party, payment method data (i.e., forwarding payment method data from a first party to a third party), is described. In the example of method 300, the third party does not have a relationship with the payment service provider used by the first party. Accordingly, payment method tokens and payment method grants cannot be used to share payment data. In the example of method 300, a user may provide, to the first party, sensitive data such as payment method data (e.g., credit card information), which the first party may then transmit to a payment service provider. The payment service provider may transmit to the first party a payment method token. As described above, the first party may provide a platform, such as a website or application, in which its users discover products offered by various third party merchants. The first party may wish to provide an easier method for their users to purchase products and services from the third party merchants without repeatedly having to enter their payment information. Method 300 may be used in place of method 100 for third party merchants, businesses and other entities who already comply with security standards for credit card information, and who wish to process their own payments using a different payment service provider than that used by the first party. From the first party's perspective, the first party may maintain the entire checkout experience without having users leave the first party's website or application, avoiding disjointed user experiences. Method 300 may also ensure consistency and efficiency for consumers, and may increase conversion rates for the first party platforms.

Method 300 begins at block 302, where a user triggers a transaction flow with a third party merchant using the first party's website or application. For example, the user may wish to purchase a shirt offered by a third party clothing store that was discovered using the first party's social networking application.

Method 300 then proceeds to block 304, where the first party transmits a forwarding request to its payment service provider to provide payment details for the transaction to the third party. In one embodiment, the request includes the first party's payment method token for the user's payment information, and configuration information for the third party merchant. In one embodiment, the configuration information determines how the payment service provider will make transactional requests to the third party merchant. In one embodiment, the configuration information is previously provided from the first party to the payment service provider. In one embodiment, the configuration information may be provided in a JavaScript Object Notation (JSON) file.

In one embodiment, the configuration information for a third party merchant includes data for the format of the request to the merchant, acceptable HTTP methods, a uniform resource locator (URL) for a payment processor endpoint, a path to a credit card processing form, types of payment methods accepted by the third party merchant. In one embodiment, placeholder variables in the configuration information are replaced with tokenized credit card data when the configuration information is used in a transaction.

In one embodiment, various transformations are included within configuration information, which may specify where payment method data should be included in a forwarding request. Transformations may take advantage of a domain-specific language to programmatically modify the contents of a request, which may use S-expressions represented by JSON arrays. As a non-exhaustive list of examples, transformations may include hash functions, template references, and variable overrides.

Method 300 then proceeds to block 306, where the payment service provider exchanges the payment method token for a raw personal account number (e.g., a credit card number), and packages the raw personal account number and other information in a format acceptable by the third party merchant. The packaged information is then transmitted to the third party merchant to process the user's transaction. In one embodiment, the packaging process refers to the configuration information provided by the first party. Further, in one embodiment, the payment method token is used to search for payment data in the payment service provider vault. In one embodiment, the payment service provider may provide packaged information for multiple transactions at one time, in a batch, to the third party merchant. Thus, for example, a batch of packaged information for multiple transactions and/or multiple users may be sent every 5 minutes or at another time interval. In one embodiment, the payment service provider may provide information for multiple payment methods in response to a single request.

In one embodiment, the configuration information may use the payment service provider as a token service provider, which may allow the third party to create a transaction without having direct access to the user's payment information. Accordingly, instead of exchanging the payment method token for a raw personal account number, the payment method token is exchanged for tokenized payment information (e.g., a tokenized credit card number). In one embodiment, the configuration information with tokenized payment information can set options or limits on the use of the payment method, for example, a maximum transaction amount.

Method 300 then proceeds to block 308, where the payment service provider receives a response from the third party merchant endpoint, which may be a response from the API of the merchant endpoint. In one embodiment, the response from the third party merchant endpoint includes an HTTP response with a body, headers, and a status code. For example, the response may include an indication that the user's credit card was successfully charged, and that the user's order has been processed. Method 300 then proceeds to block 310, where the payment service provider may forward the response from the third party merchant to the first party, which can then present the merchant's response to the user.

In one embodiment, data transmitted between the first party, the payment service provider, and the third party, may be encrypted. In one embodiment, advanced encryption scheme (AES) is used. In one embodiment, the configuration file may include the encryption keys needed to decipher encrypted data. In one embodiment, a Hashed Method Authentication Mode (HMAC) method using a secure hash algorithm (SHA) 256 (i.e. HMAC-SHA-256) may be used for encryption. In one embodiment, data transmitted between the various parties and devices may include an XML digital signature.

Figure 4:
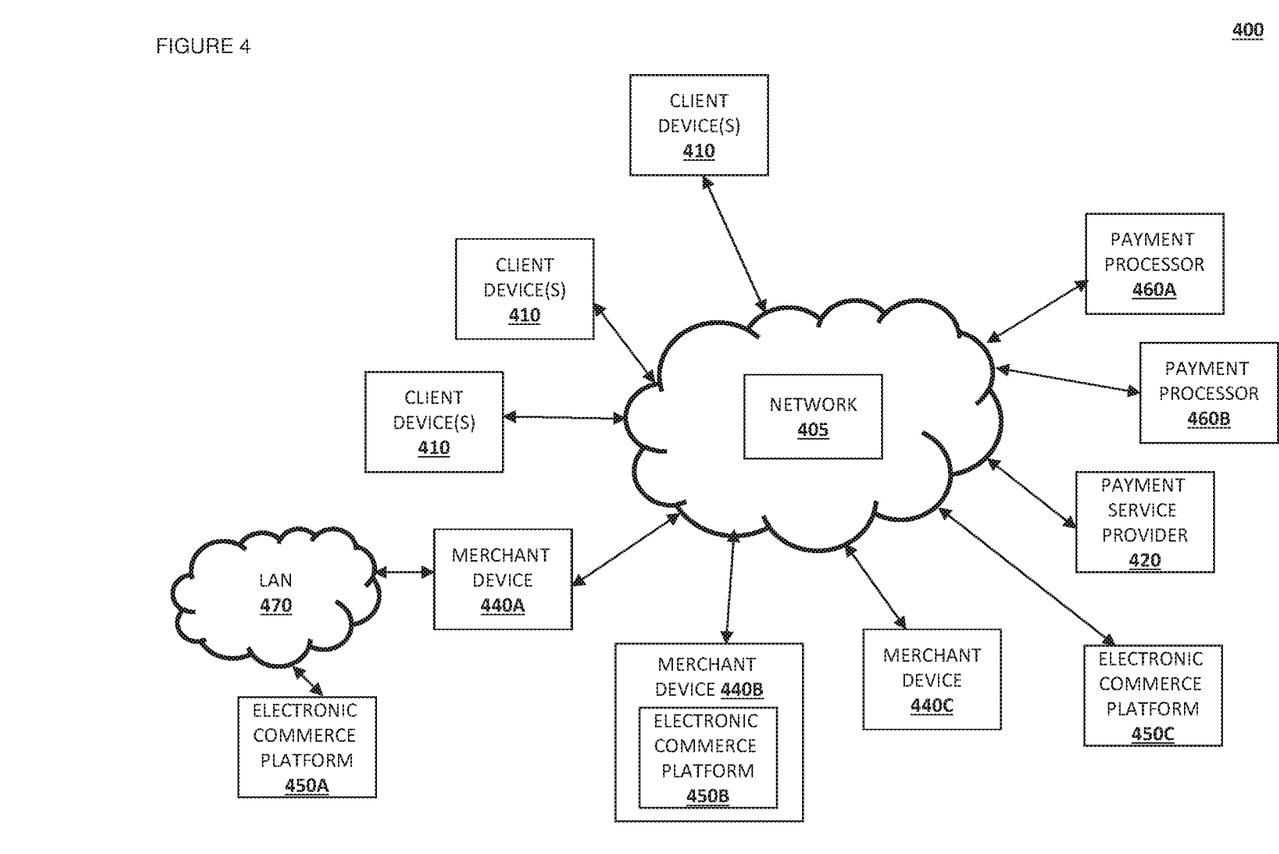
FIG. 4 is a schematic view illustrating an embodiment of a networked system.

Referring now to FIG. 4, an embodiment of a networked system 400 is illustrated. As described above, electronic commerce involves a multitude of devices and parties connected to a network. As shown, networked system 400 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the devices, platforms, and servers illustrated in FIG. 4 may be deployed in other ways and that the operations performed and/or the services provided by such servers may be combined or separated for a given implementation and may be performed by a greater number or fewer number of servers. One or more devices, platforms, and servers may be operated and/or maintained by the same or different entities.

The networked system 400 includes multiple devices that are coupled to a network 405, which may include the Internet or another wide area network. For example, the networked system 400 includes one or more client devices 410, which may include, for example, mobile devices, desktop computers, tablet computers, laptop computers, and the like. Client devices 410 may be utilized by the users described herein to access first party merchant applications, websites, and other platforms. The client devices 410 may be implemented using any appropriate combination of hardware and/or software configured for wired and/or wireless communication over network 410. The client devices 410 may include one or more browser applications which may be used, for example, to provide a convenient interface to permit the client to browse information available over the network 410. For example, in one embodiment, the browser application may be implemented as a web browser configured to view information available over the Internet.

Networked system 400 further includes a plurality of merchants operating merchant devices 440A-440C, which may also operate on one or more servers. Merchant devices 440A-440C may be used by any type of merchant offering their goods to purchasers online, and may include merchants wishing to offer their goods to users. Each merchant device 440A-440C may be a first party merchant or a third party merchant as described herein. Each merchant device 440A-440C may be associated with a respective electronic commerce platform 450A-450C. Depending on the particular merchant, a merchant may host an electronic commerce platform, connected to its merchant device via its own internal network or local area network 470, such as the electronic commerce platform 450A coupled to merchant device 440A via LAN 470. A merchant may also operate an electronic commerce platform 450B on its own merchant device 440B. Additionally, a merchant may use an electronic commerce platform 450C via the network 405, as in the case of merchant 440C.

Networked system 400 further includes a payment service provider 420, connected to network 105. The payment service provider 420 may provide the functionality described herein, such as vaulting payment methods, granting payment methods, providing forwarding of payment information, and the like. One such payment service provider 420 may be, for example, BRAINTREE®. Networked system 400 further includes a plurality of payment processors 460A-460B, connected to network 405. Such payment processors may include credit card processors and other similar parties. One such payment processor 460 may be operated by a payment service provider such as, for example, PAYPAL® Inc. of San Jose, Calif.

The client devices 410, merchant devices 440, electronic commerce platforms 450, payment service provider 420, and payment processors 460 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 400, and/or accessible over the network 405.

The network 405 may be implemented as a single network or a combination of multiple networks. For example, in various embodiments, the network 405 may include the Internet and/or one or more intranets, landline networks, wireless networks, and/or other appropriate types of networks.

Figure 5:
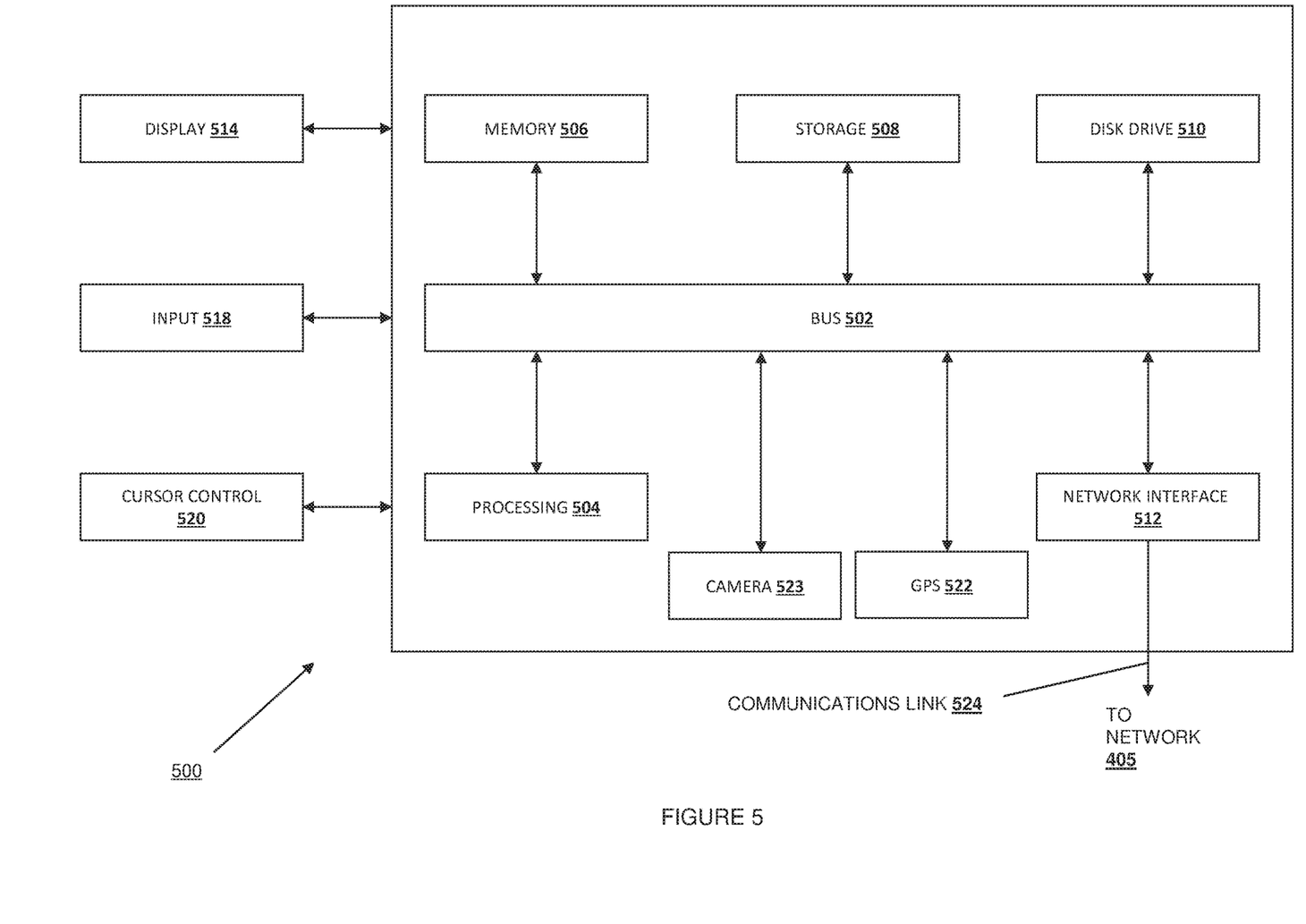
FIG. 5 is a schematic view illustrating an embodiment of a computer system.

Referring now to FIG. 5, an embodiment of a computer system 500 suitable for implementing, for example, client devices 410, merchant devices 440, electronic commerce platforms 450, payment service provider 420, and/or payment processors 460, is illustrated. It should be appreciated that other devices utilized by customers, merchants, payment service providers, third party payment processors, and/or system providers in the system discussed above may be implemented as the computer system 500 in a manner as follows.

In accordance with various embodiments of the present disclosure, computer system 500, such as a computer and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), a location determination component 522 (e.g., a Global Positioning System (GPS) device as illustrated, a cell tower triangulation device, and/or a variety of other location determination devices known in the art), and/or a camera component 523. In one implementation, the disk drive component 510 may comprise a database having one or more disk drive components.

In accordance with embodiments of the present disclosure, the computer system 500 performs specific operations by the processor 504 executing one or more sequences of instructions contained in the memory component 506, such as described herein with respect to the client devices 410, merchant devices 440, electronic commerce platforms 450, payment service provider 420, and payment processors 460. Such instructions may be read into the system memory component 506 from another computer readable medium, such as the static storage component 508 or the disk drive component 510. In other embodiments, hard-wired circuitry may be used in place of or in combination with software instructions to implement the present disclosure.

Logic may be encoded in a computer readable medium, which may refer to any medium that participates in providing instructions to the processor 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 500. In various other embodiments of the present disclosure, a plurality of the computer systems 500 coupled by a communication link 524 to the network 405 (e.g., such as a LAN, WLAN, PTSN, and/or various other wired or wireless networks, including telecommunications, mobile, and cellular phone networks) may perform instruction sequences to practice the present disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system of a service provider for providing a scope-delimited encoding of sensitive data, comprising:
a non-transitory memory storing instructions; and
one or more hardware processors coupled to the non-transitory memory and configured to execute the instructions from the non-transitory memory to cause the system to perform operations comprising:
receiving, by the service provider and from a first party in response to a request from a user to provide payment information of the user to a third party, a grant request to an application programming interface to provide a scope-delimited encoding of the payment information, wherein the grant request includes an encoding of the payment information, wherein the user is different from the first party and the third party, wherein the first party includes a first merchant that offers a platform, wherein the third party includes a second merchant offering goods or services through the platform, and wherein the grant request includes an access token that contains encoded information that identifies the third party;
generating, by the service provider, the scope-delimited encoding of the payment information based on the encoding of the payment information;
providing, by the service provider and to the first party, the scope-delimited encoding of the payment information;
receiving, by the service provider and from the third party, a transaction request, the transaction request including the scope-delimited encoding of the payment information;
processing, by the service provider, the transaction request; and
in response to a revocation request from the first party, revoking, by the service provider, an access of the third party to the scope-delimited encoding of the payment information.

2. The system of claim 1, wherein the operations further comprise: storing, by the service provider, the payment information in a vault, and wherein the grant request specifies whether the second merchant can store the scope-delimited encoding of the payment information.

3. The system of claim 1, wherein the operations further comprise deleting the scope-delimited encoding of the payment information in response to the revocation request.

4. The system of claim 1, wherein the revocation request is an HTTP POST request to the application programming interface, and wherein the revocation request includes the scope-delimited encoding of the payment information.

5. The system of claim 1, wherein the grant request to provide the scope-delimited encoding of the payment information includes one or more of a time expiry or a specific amount for the scope-delimited encoding, and wherein the operations further comprise generating the scope-delimited encoding of the payment information according to the time expiry or the specific amount.

6. The system of claim 1, wherein the operations further comprise:
transmitting an error code response to the third party when the access to the scope-delimited encoding of the payment information to the third party is revoked.

7. The system of claim 1, wherein the operations further comprise receiving, from the first party, an update to a scope-delimited encoding of the payment information, and transmitting a notification of the update to the third party.

8. A computer-implemented method, comprising:
receiving, by a service provider and from a first party in response to a request from a user to provide payment information of the user to a third party, a grant request to an application programming interface to provide a scope-delimited encoding of the payment information of the user associated with the first party, wherein the grant request includes an encoding of the payment information, wherein the user is different from the first party and the third party, wherein the first party includes a first merchant that offers a platform offered by a first merchant, and wherein the third party includes a second merchant offering goods or services through the platform and wherein the grant request includes an access token that contains encoded information that identifies the third party;
generating, by the service provider, the scope-delimited encoding of the payment information based on the encoding of the payment information in the grant request;
providing, by the service provider and to the first party, the scope-delimited encoding of the payment information;
receiving, by the service provider and from the third party, a transaction request, the transaction request including the scope-delimited encoding of the payment information;
processing, by the service provider, the transaction request; and
in response to a revocation request from the first party, revoking an access by the third party to the scope-delimited encoding of the payment information.

9. The method of claim 8, further comprising: storing, by the service provider, the payment information.

10. The method of claim 8, further comprising deleting the scope-delimited encoding of the payment information in response to the revocation request.

11. The method of claim 8, wherein the revocation request is an HTTP POST request to the application programming interface, and wherein the revocation request includes the scope-delimited encoding of the payment information.

12. The method of claim 8, wherein the grant request to provide the scope-delimited encoding of the payment information includes one or more of a time expiry or a specific amount for the scope-delimited encoding, and wherein the method further comprises generating the scope-delimited encoding of the payment information according to the time expiry or the specific amount.

13. The method of claim 8, further comprising:
transmitting an error code response to the third party when the access to the scope-delimited encoding associated with the third party is revoked.

14. The method of claim 8, further comprising receiving, from the first party, an update to a scope-delimited encoding of the payment information, and transmitting a notification of the update to the third party.

15. A non-transitory machine-readable medium having stored thereon machine-readable instructions executable to cause a machine to perform operations comprising:
receiving, by a service provider and from a first party in response to a request from a user to provide a payment information of the user to a third party, a grant request to an application programming interface to provide a scope-delimited encoding of the payment information, wherein the grant request includes an encoding of the party payment information, wherein the user is different from the first party and the third party, wherein the first party includes a first merchant that offers a platform, wherein the third party includes a second merchant offering goods or services through the platform, and wherein the grant request includes an access token that contains encoded information that identifies the third party;

generating, by the service provider, the scope-delimited encoding of the payment information based on the encoding of the payment information in the grant request;

providing, by the service provider and to the first party, the scope-delimited encoding of the payment information;

receiving, by the service provider and from the third party, a transaction request, the transaction request including the scope-delimited encoding of the payment information;

processing, by the service provider, the transaction request; and in response to a revocation request from the first party, revoking, by the service provider, an access by the third party to the scope-delimited encoding of the payment information.

16. The machine-readable medium of claim 15, wherein the operations further comprise: storing, by the service provider, the payment information.

17. The machine-readable medium of claim 15, wherein the operations further comprise deleting the scope-delimited encoding of the payment information in response to the revocation request.

18. The machine-readable medium of claim 15, wherein the revocation request is an HTTP POST request to an application programming interface, and wherein the revocation request includes the scope-delimited encoding of the payment information.

19. The machine-readable medium of claim 15, wherein the grant request to provide the scope-delimited encoding of the payment information includes one or more of a time expiry or a specific amount for the scope-delimited encoding, and wherein the operations further comprise generating the scope-delimited encoding of the payment information according to the time expiry or the specific amount.

20. The machine-readable medium of claim 15, wherein the operations further comprise receiving, from the first party, an update to the scope-delimited encoding of the payment information, and transmitting a notification of the update to the third party.

* * * * *